US010923913B2

(12) United States Patent
Froehner et al.

(10) Patent No.: US 10,923,913 B2
(45) Date of Patent: Feb. 16, 2021

(54) METHOD FOR OPERATING AN ELECTRICAL ENERGY SUPPLY NETWORK, AND CONTROL DEVICE FOR CONTROLLING DEVICES OF AN ELECTRICAL DISTRIBUTION NETWORK

(71) Applicant: SIEMENS AKTIENGESELLSCHAFT, Munich (DE)

(72) Inventors: Wiebke Froehner, Amberg (DE); Thomas Werner, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 52 days.

(21) Appl. No.: 16/356,078

(22) Filed: Mar. 18, 2019

(65) Prior Publication Data
US 2019/0288508 A1  Sep. 19, 2019

(30) Foreign Application Priority Data

Mar. 16, 2018  (EP) .................................... 18162232

(51) Int. Cl.
 *H03J 3/06* (2006.01)
 *H02J 3/06* (2006.01)
 (Continued)

(52) U.S. Cl.
 CPC .............. *H02J 3/06* (2013.01); *G05B 13/024* (2013.01); *G05B 13/027* (2013.01); *G06N 3/084* (2013.01);
 (Continued)

(58) Field of Classification Search
 CPC ........................................................ H02J 3/06
 See application file for complete search history.

(56) References Cited

U.S. PATENT DOCUMENTS 6,583,521 B1 *  6/2003  Lagod ..................... H02J 3/005
                                                    307/29
9,806,524 B2 * 10/2017  Rosendahl ................ H02J 3/14

FOREIGN PATENT DOCUMENTS

| EP | 2533398 A2 | 12/2012 |
| EP | 2752969 A1 | 7/2014 |
| EP | 3107174 A1 | 12/2016 |

OTHER PUBLICATIONS

Guping Zheng, et al.: "Multi-Agent Based Control System for Multi-Microgrids", Computational Intelligence and Software Engineering (CISE), 2010 International Conference on, IEEE, Piscataway, NJ, USA,pp. 1-4, XP031841252, ISBN: 978-1-4244-5391-7, Section III; 2010.

* cited by examiner

*Primary Examiner* — Hai L Nguyen
(74) *Attorney, Agent, or Firm* — Laurence Greenberg; Werner Stemer; Ralph Locher

(57) ABSTRACT

For providing system services reliably for an energy supply network, measured values indicating an electrical state of the supply network and/or of a distribution network are recorded. A deviation of the operational state of the supply network from a required operational state is determined and control measures are defined for restoring the required operational state. Control data which indicate a part of the control measures to be carried out by devices of the distribution network are transmitted to the control device, and control commands are determined for the devices of the distribution network with which the devices are controlled such that the distribution network carries out the required control measures. Estimated control data are defined and the communication connection to a network controller is monitored. In the event of a fault in the communication connec- (Continued)

tion, the control commands are defined using the estimated control data instead of the control data.

10 Claims, 3 Drawing Sheets

(51) Int. Cl.
*G05B 13/02* (2006.01)
*H02J 3/18* (2006.01)
*H02J 13/00* (2006.01)
*G06N 3/08* (2006.01)
*G06N 20/10* (2019.01)
*H02J 3/12* (2006.01)
*H02J 3/38* (2006.01)

(52) U.S. Cl.
CPC ............ *H02J 3/18* (2013.01); *H02J 13/0013* (2013.01); *H02J 13/0086* (2013.01); *G06N 20/10* (2019.01); *H02J 3/12* (2013.01); *H02J 3/382* (2013.01); *H02J 13/0089* (2013.01)

METHOD FOR OPERATING AN ELECTRICAL ENERGY SUPPLY NETWORK, AND CONTROL DEVICE FOR CONTROLLING DEVICES OF AN ELECTRICAL DISTRIBUTION NETWORK

CROSS-REFERENCE TO RELATED APPLICATION

This application claims the priority, under 35 U.S.C. § 119, of European application EP 18162232.5, filed Mar. 16, 2018; the prior application is herewith incorporated by reference in its entirety.

BACKGROUND OF THE INVENTION

Field of the Invention

The invention relates to a method for operating an electrical energy supply network which is connected to a connection station with a lower-level distribution network, wherein the operation of the energy supply network is controlled by a network control system. The invention also relates to a control device for controlling devices of the electrical distribution network.

One of the most important tasks of operators of energy supply networks is to secure and improve the reliability of supply. Energy supply networks are normally subdivided into a plurality of voltage levels, for example into a high-voltage level (above approx. 30 kV) via which power is transmitted over long distances, a medium-voltage level (approx. 1 kV to 30 kV) for the distribution of electrical energy and for the connection of industrial operations, and a low-voltage level (below 1 kV) for the distribution of electrical energy to the end consumer. The energy supply networks of the different voltage levels are not necessarily operated by the same operator.

Whereas energy supply networks at the high-voltage and medium-voltage level are normally monitored, controlled and protected by automation systems, no or only a small amount of automation has hitherto been present in low-voltage networks, which are also referred to as local networks. The one-way energy flow in the energy supply network from the central generator to the distributed consumers has hitherto not generally required automation, e.g. load management, in the low-voltage networks required for the distribution.

However, the increasing number of decentralized generating plants, storage devices and electric vehicles at the low-voltage level now requires a modified operational management of the local networks. The ability to intervene when required in the operation of the connected plants is therefore necessary in order to satisfy the technical boundary conditions and support the present and future business models in the network operation and in the energy market.

For this purpose, it is frequently advisable to perform the monitoring and control or regulation of the plants in the low-voltage networks using decentralized, intelligent systems which are located in the local network stations. In this context, it is known, for example from published, European patent application EP 3 107 174 A1, to provide a control device in a local network station which estimates the electrical state of the low-voltage network using a small number of electrical measured values and external state values (e.g. temperature).

One advantage of the automated control of local networks is furthermore that network services can thereby be provided for the higher-level medium-voltage network. Adherence to voltage bands, adherence to the network frequency and balancing of feed-in and consumption of electrical energy, for example, are regarded as network services in this context. Means for performing network services may consist e.g. in the targeted feed-in or removal of reactive power for voltage reactive power optimization (Voltage VAr Control), the targeted feed-in or removal of active power, and also the activation or deactivation of generators or consumers. Devices of the distribution network, e.g. generators and consumers, storage devices, switching devices, capacitor banks, inductors and step switches of transformers must be controlled accordingly in order to provide the system services.

Through the provision of system services for the medium-voltage network, the local network can help stabilize the operation of the medium-voltage network and reduce the need to expand the medium-voltage network. The definition of the necessary network services normally requires a consideration of the load flow situation of the entire medium-voltage network.

This will be explained with reference to the following example. The increasing decentralized feed-in at the low-voltage level and the facilities for controlling electrical loads centrally cause the operators of local networks to provide automation to an increased extent. The growing number of small and medium-sized generators (sources) of renewable energies, e.g. solar power, power from biomass power plants or wind power installations, increasingly results in a two-way energy flow in the low-voltage network, as a result of which e.g. voltage fluctuations can be produced. Such voltage fluctuations which occur with increasing frequency force network operators to counteract these through regulating or controlling interventions. In order to be able to maintain the voltage level within the prescribed voltage bands in low-voltage networks, network operators increasingly employ methods for voltage reactive power optimization, making use, for example, of adjustable transformers or capacitive banks. Such methods are generally organized and controlled by the network control system. In the hierarchical network service provision concept envisaged in the digital local network, the setpoint values calculated by the voltage reactive power optimization of the network control system in the medium-voltage network must be transmitted in this example to the local network stations.

Network operators generally operate highly reliable private communication networks which extend from the network control centers to the substations. A continuation of these communication networks through to the local network stations is complex and expensive due to the large number of local network stations and their geographical distribution. Public communication services, such as, for example, mobile radio communications, offer an alternative facility for transmitting data to the local network station, but do not offer the necessary, very high reliability. In the event of communication outages, the information required to control the local network cannot be transmitted.

On this basis, the person skilled in the art must therefore address the object of being able to provide system services for the energy supply network reliably, even in the event of a fault in the communication connection.

SUMMARY OF THE INVENTION

This object is achieved by a method for operating an electrical energy supply network in which the energy supply network (e.g. a medium-voltage network) is connected to a connection station (e.g. a local network station) with a lower-level distribution network (e.g. a local network or a low-voltage network), wherein the operation of the energy supply network is controlled by a network control system. A connection station of this type normally has a transformer and, if necessary, a busbar and switching and protection devices. Protection devices may be electrical protection devices and/or fuses.

According to the invention, measured values indicating an electrical state of the energy supply network and/or the distribution network are recorded at the connection station with a local control device of the distribution network and a deviation of the current operational state of the energy supply network from a required operational state is determined. Control measures which are suitable for restoring the required operational state are defined with the network control system. Control data are transmitted from the network control system to the local control device, wherein the control data indicate at least a part of the control measures which is intended to be carried out by devices of the distribution network. Control commands for one or more of the devices of the distribution network are determined by the local control device using the received control data, wherein the control commands are suitable for controlling the devices in such a way that the distribution network carries out the required part of the control measures in relation to the energy supply network. Estimated control data are furthermore defined by the local control device using the measured values. The communication connection between the local control device and the network control system is monitored and the control commands are defined in the event of a fault in the communication connection using the estimated control data instead of the received control data.

As a result, it can advantageously be achieved that the distribution network can provide the system services for the energy supply network even in the event of a communication fault. The network control system generally defines the network services which are intended to be supported by the distribution network for each specific load situation of the higher-level energy supply network. This information is transmitted via a communication connection to the local control device of the distribution network. The local control device then defines the control commands for the provision of the required network service which must be provided by the actuators connected in the low-voltage network and transmits these commands via local communication methods (for example Power Line Communication) to the actuators.

The calculation of the required network services in the energy supply network is instigated, for example, if the operational states in the energy supply network change significantly, for example through changes in the feed-in or load situation. This means that these requirements must be transmitted spontaneously to the local control device. The communication connection should consequently be highly reliable, which, as explained above, cannot always be guaranteed. In the method according to the invention, the system service requirements of the higher-level energy supply network in respect of the distribution network are estimated by the local control device through local and autonomous observations, so that the estimated control data can be used in the event of a communication fault.

One advantageous embodiment of the method according to the invention provides that the estimated control data are defined with a self-learning system.

An artificial neural network, for example, can be used here as a self-learning system. Artificial neural networks are information technology structures which can "learn" a relationship between input signals (e.g. an input vector $\underline{E}$) and output signals (e.g. an output vector $\underline{A}$):

$$\underline{A}=f(\underline{E}). \qquad \text{a)}$$

An artificial neural network consists of a plurality of neurons which are interconnected. The neurons are normally arranged in a plurality of layers. A first layer is formed by an input layer of neurons to which the individual elements of the input signals are applied; one element of the input signal is normally fed to each neuron of the input layer. On the output side, the artificial neural network has an output layer whose neurons in each case represent individual elements of the output signals. One or more layers, referred to as "hidden layers" or "hidden neurons", lie between the input layer and the output layer. The neurons of the input layer are connected to all or selected neurons of the first layer of hidden neurons. The latter are in turn connected to all or selected neurons of any second layer of hidden neurons, etc. The last layer of hidden neurons is finally connected to the neurons of the output layer. The behavior of a neural network and therefore the response of the neurons of the output layer and also signals applied to the neurons of the input layer is defined by training parameters. These are, for example, threshold values as from which a neuron emits a signal to a following neuron, and/or weighting factors for the probability of a signal transmission between two consecutive neurons.

Alternatively to an artificial neural network, a support vector machine or other machine learning components can also be used.

An essential concept of the solution proposed here therefore consists in determining estimated control data with the local control device. For this purpose it is proposed to use artificial neural networks or comparable methods as classifiers which learn a relationship between the measured values recorded in the connection station (e.g. current and voltage measured values and also frequency measurements and the network service requirements of the higher-level energy supply network. The local control device in the connection station is therefore capable of organizing the network services in the distribution network, even without communication with the network control system, in such a way that they support the operation of the energy supply network.

In connection with the aforementioned advantageous embodiment, it can specifically be provided that training data which comprise pairs of measured values and associated received control data are used to train the behavior of the self-learning system.

A plurality of methods known per se to the person skilled in the art generally exist for the training. According to the "multilayer perceptron" method, a series of input vectors and output vectors which are known to match the input vectors are first presented to the neural network. These output vectors have either been calculated with an external method or they originate from measurements on the real technical object. The output vectors calculated by the neural network are compared with the predefined output vectors. The differences between the calculated and the expected values are evaluated and used to modify the parameters of the calculation algorithm of the neural network (also referred to as "back propagation"). The training is ended as soon as the calculation results of the neural network sufficiently exactly match the expected values.

The need for complex calculations by the local control device is eliminated on the one hand through the use of an artificial neural network which is trained to determine corresponding estimated control data (output vector) from measured values of this type (input vector) which indicate an electrical state of the energy supply network and/or of the distribution network at the connection station, the control data indicating control measures assumed for the input vector which are intended to be carried out by devices of the distribution network in order to restore a required operational state of the energy supply network. No complex algorithms therefore need to be executed in the control device; an implementation of a simple artificial neural network today no longer imposes any particular demands on a processor.

In this connection, it can be provided, for example, that the learning of the self-learning system is carried out by the local control device.

Alternatively, however, it can also be provided that the training data are transmitted to an external data processing device for the training of the self-learning system, and system parameters are generated with the external data processing device in a learning process, the system parameters being transmitted to the self-learning system following the learning process and being adopted by the self-learning system.

The particular advantage of this embodiment is that the training process does not have to be performed by the local control device itself. The training is carried out instead by a data processing device outside the local control device which may be more powerful than the local control device itself. This data processing device may, for example, be a computer of a central network control station or a cloud service which is offered by a corresponding service provider.

According to this embodiment, a distinction is therefore made between the following two components: The local control device already explained performs a definition of estimated control data, as described above, by means of a self-learning system, e.g. an artificial neural network. In addition, an external data processing device also exists which may be a single computer or a local or distributed accumulation of a plurality of computers or a computer system. The external data processing device is used to train the neural network.

For this purpose, a self-learning system, e.g. an artificial neural network ("second neural network"), the structure of which matches the structure of the artificial neural network of the local control device, is similarly implemented on the external data processing device. This second neural network is trained using the stored training data in the form of the recorded measured values and associated control data calculated by the network control system of the energy supply network. The generated training parameters, e.g. threshold values of the individual neurons and/or weighting factors for connections between individual neurons, are then transmitted to the neural network of the local control device and are implemented there for operation.

It can specifically be provided that measured values of at least one of the following measured quantities are used:
a) three-phase values of the AC electric current in the vicinity of the connection station which are recorded on the side of the energy supply network (e.g. medium-voltage network) and/or on the side of the distribution network (e.g. low-voltage network or local network);
b) three-phase values of the AC electric voltage in the vicinity of the connection station which are recorded on the energy supply network (e.g. medium-voltage network) side and/or on the distribution network (e.g. low-voltage network or local network) side;
c) frequency of the AC current;
d) ambient temperature in the vicinity of the connection station;
e) solar radiation in the vicinity of the connection station; and
f) wind strength in the vicinity of the connection station.

The aforementioned measured quantities are suitable individually or in combination for making inferences regarding the operational state of the higher-level energy supply network. Those measured quantities which indicate weather data can be recorded locally in the vicinity of the connection station (e.g. by means of corresponding sensors of a local network station) and/or can be obtained locally from external systems (e.g. weather services).

If, for example, renewable energy generators in the form of photovoltaic installations or wind power installations are present in the energy supply network or in the distribution network, their feed-in of electrical energy is dependent on the current weather, for example solar radiation (for photovoltaic installations) and wind direction and wind strength (for wind power installations). This information can be fed to the local control device. In this case, the neural network is trained on the basis of historical weather recordings to estimate the control data influenced by the different feed-in situations in the energy supply network and/or in the distribution network using the measured values in the form of temperature, wind strength and/or solar radiation.

According to a further advantageous embodiment of the method according to the invention, it is provided that the received control data are compared with the estimated control data by the local control device and, in the event of an unacceptable difference, the behavior of the self-learning system is retrained.

In this way, the quality of the estimated control data can be determined continuously during the normal operation of the system, i.e. with a functional communication connection between the local control device and the network control system. To do this, the estimated control data are compared with the control data determined by the network control system through calculations. If substantial differences occur which lie above a threshold value defined for this purpose, a further learning process of the self-learning system can be instigated.

It can furthermore also be provided that the measured values are transmitted from the local control device to the network control system of the energy supply network.

In this way, the measured values are not only used for the calculations of the local control device, but can also be used for network control functions of the network control system. Here, the local control device can perform the function of a merging unit or data concentrator.

A particular situation prevails in the case of a black start of the energy supply network. This occurs following a complete power failure of the energy supply network when the power supply is restored gradually. A case such as this is difficult for a self-learning system to control, so that a corresponding detection should take place. A further advantageous embodiment of the method according to the invention therefore provides that the frequency of the current on the energy supply network side of the connection station is recorded by means of the local control device and, in the event of a fault in the communication connection, fixed, predefined control data are used instead of the estimated control data if the frequency lies outside a predefined frequency band.

In this way, previously defined measures are carried out in the event of a black start which can be detected from the frequency of the energy supply network. In this case, the estimated control data are rejected in favor of the fixed, predefined control data until the energy supply network has resumed its normal operation.

It can be provided in this connection, for example, that, in the case of a frequency lying above the predefined frequency band, the predefined control data effect control commands which cause an increase in the active power consumption by the distribution network and, in the case of a frequency lying below the predefined frequency band, the predefined control data effect control commands which cause a reduction in the active power consumption by the distribution network.

The restarting of the energy supply network can be supported in this way by means of defined heuristics through corresponding control of the devices of the distribution network.

The above-mentioned object is also achieved by a control device for controlling devices of an electrical distribution network. For this purpose, it is provided that the control device has a measured value recording device to record measured values and a communication device to receive control data from a network control system of an energy supply network at a higher level than the distribution network, wherein the control data indicate control measures which are intended to be carried out by devices of the distribution network. The control device furthermore has a control unit for determining control commands for one or more of the devices of the distribution network using the received control data, wherein the control commands are suitable for controlling the devices in such a way that the distribution network carries out the control measures. The control device has an estimation device for defining estimated control data using the measured values, and a monitoring unit for monitoring the communication connection between the communication device and the network control system. The control unit is configured to determine the control commands using the estimated control data instead of the received control data if there is a fault in the communication connection.

With regard to the control device according to the invention, all details described above and below for the method according to the invention and vice versa apply accordingly, in particular the control device according to the invention is configured to carry out the method according to the invention in any given embodiment or a combination of any given embodiments. In respect of the advantages of the control device according to the invention, reference is also made to the advantages described in relation to the method according to the invention.

The invention is explained in detail below with reference to an example embodiment. The specific design of the example embodiment is not to be understood as limiting in any way for the general design of the method according to the invention and the device according to the invention; instead, individual design features of the example embodiment can be freely combined in any manner with one another and with the features described above.

Other features which are considered as characteristic for the invention are set forth in the appended claims.

Although the invention is illustrated and described herein as embodied in a method for operating an electrical energy supply network, and a control device for controlling devices of an electrical distribution network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
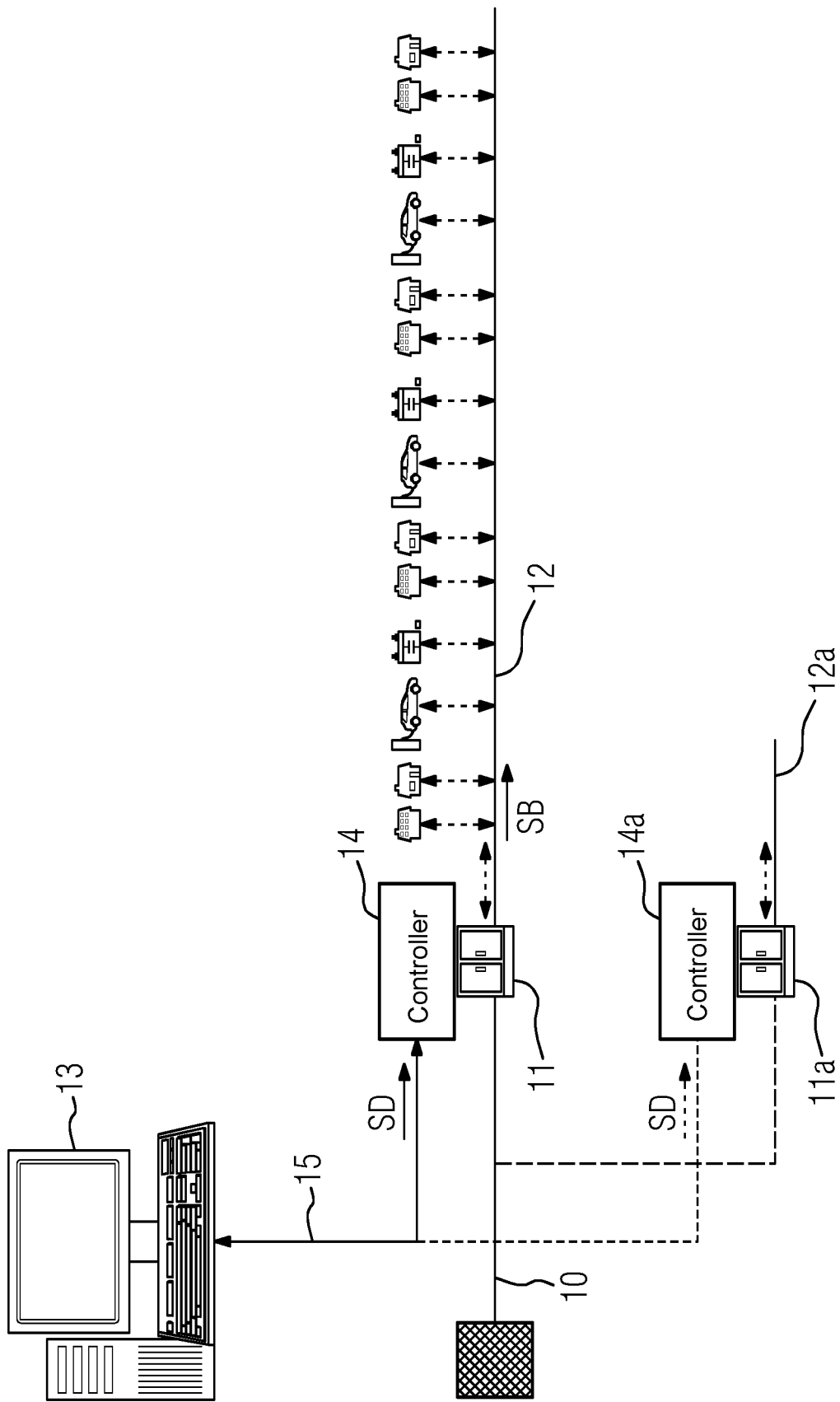
FIG. 1 is a schematic view of an energy supply network to which a distribution network is connected at a connection station according to the invention.

Referring now to the figures of the drawings in detail and first, particularly to FIG. 1 thereof, there is shown a schematic view of an energy supply network 10, indicated purely by way of example, which may, for example, be a medium-voltage network. The energy supply network is connected at a connection station 11, for example a local network station, to a lower-level distribution network 12. Devices such as consumers, generators, storage devices, but also inverters, inductors and capacitors as well as switching devices and transformers with step switches can be connected to the distribution network.

Along with the distribution network 12, further distribution networks 12a can be connected at connection stations 11a to the energy supply network 10.

The operation of the energy supply network 10 is controlled via a network control system 13. This serves, in particular, to maintain the operational state of the energy supply network 10 within predefined limits. Such limits may, for example, be voltage and frequency ranges which are adhered to during the operation of the energy supply network. The performance of system services entails adherence to these predefined limits. Measures for carrying out the system services are, for example, the feed-in or removal of active and/or reactive power in order to influence the voltage and/or frequency of the energy supply network.

An increasing number of active devices (PV installations, wind power installations, storage devices, etc.) in the distribution networks increases the need to provide system services of this type at least partially in the distribution network also and therefore to contribute to the stability of the operation of the energy supply network and the distribution network.

For this purpose, inter alia, a local control device 14 is present at the connection station 11. The local control device 14 ensures in a manner described in detail below that the required system services are provided by the distribution network.

Corresponding local control devices 14a are also provided at the further connection stations 11a.

The operational state of the energy supply network 10 is monitored with the network control system 13. If changes from a predefined operational state occur, e.g. a modification of the frequency or the voltage in the energy supply network, control measures which are suitable for restoring the required operational state of the energy supply network are determined by the network control system. The network control system normally performs complex load flow calculations for this purpose. In the event of a detected voltage deviation, for example, such control measures can indicate a value of the reactive power which is to be fed into the energy supply network 10 in order to readjust the voltage to the setpoint value.

The network control system 13 furthermore defines a part of the control measures which is to be carried out by the distribution network 12. This system service requirement is transmitted in the form of control data SD from the network control system via a communication connection 15 to the local control device 14 (and, where appropriate, the further control devices 14a). Control commands SB are determined by means of the local control device 14 using the received control data SD and are forwarded to at least one of the devices of the distribution network, e.g. via a Power Line Communication. These control commands SB cause the corresponding unit to modify its operational state in such a way that at least a part of the control measures required by the control data SD is carried out. An inverter, for example, can be controlled in such a way that it feeds a specific quantity of reactive power into the distribution network 12.

As a result of the execution of all control commands SB transmitted to the devices of the distribution network, the distribution network carries out the control measures required by the energy supply network 10 at the connection station 11 in order to perform the system service.

Figure 2:
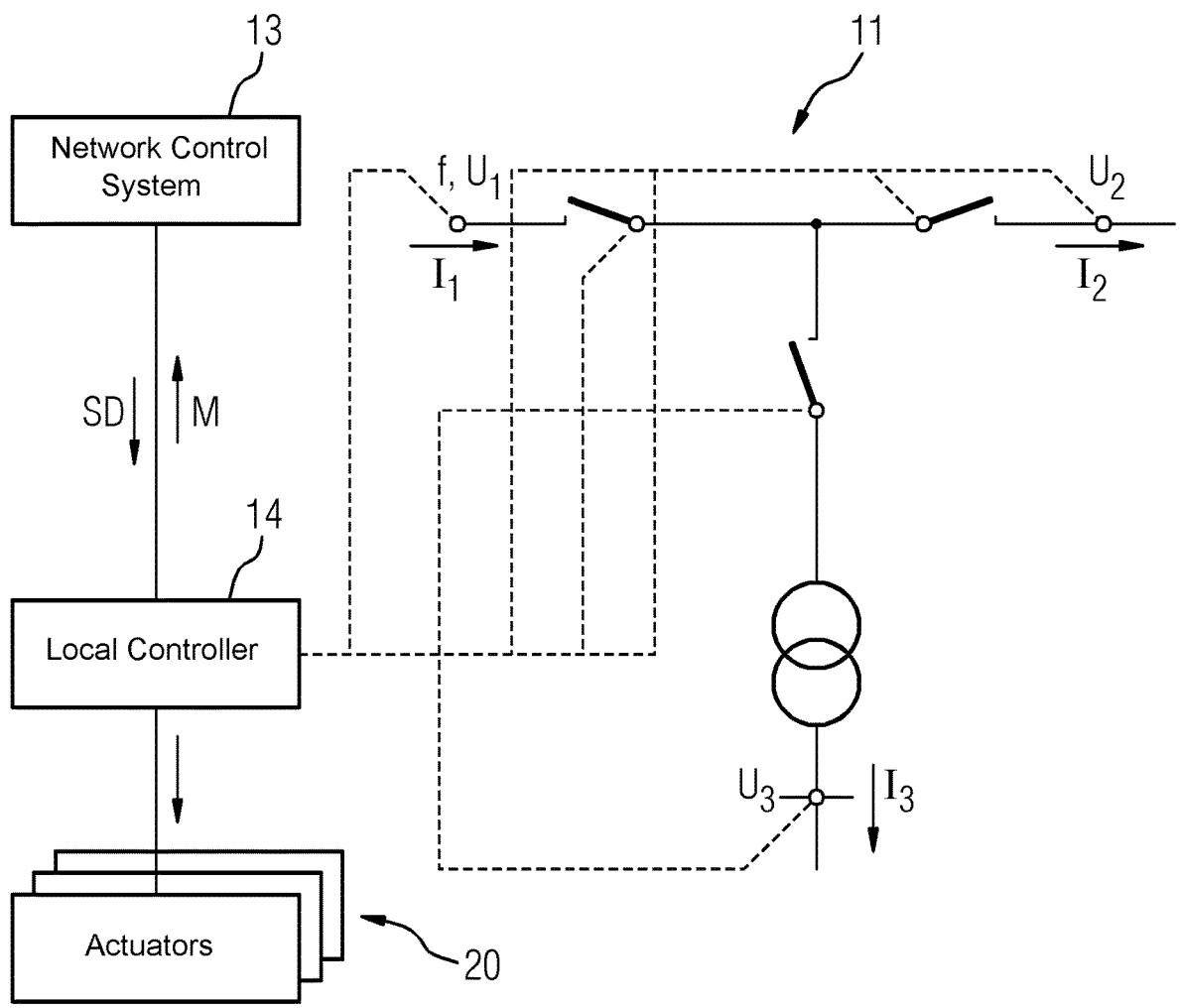
FIG. 2 is a schematic view of a connection station.

This procedure is shown in detail in FIG. 2 for a connection station 11. Measured values of measured quantities, such as e.g. electric currents $I_1$, $I_2$, $I_3$ and voltages $U_1$, $U_2$, $U_3$ and also the frequency f, are recorded with the local control device 14 at different measuring points in the vicinity of the connection station, e.g. with sensors of the local network station. Along with electrical measured quantities, measured quantities which indicate the weather in the vicinity of the connection station 11, e.g. ambient temperature, solar radiation, wind strength, and which can have an influence on renewable energy generators present in the distribution network 12 can also be recorded. These measured values M can be transmitted to the network control system 13 so that the local control device acts in this respect as a merging unit, remote terminal unit or data concentrator.

The network control system 13 transmits the control data SD with the control measures for performing the required system services to the local control device 14. Control commands SB are generated by the local control device 14 on the basis of the received control data SD and are forwarded to actuators 20 with which the devices of the distribution network 12 are controlled.

Figure 3:
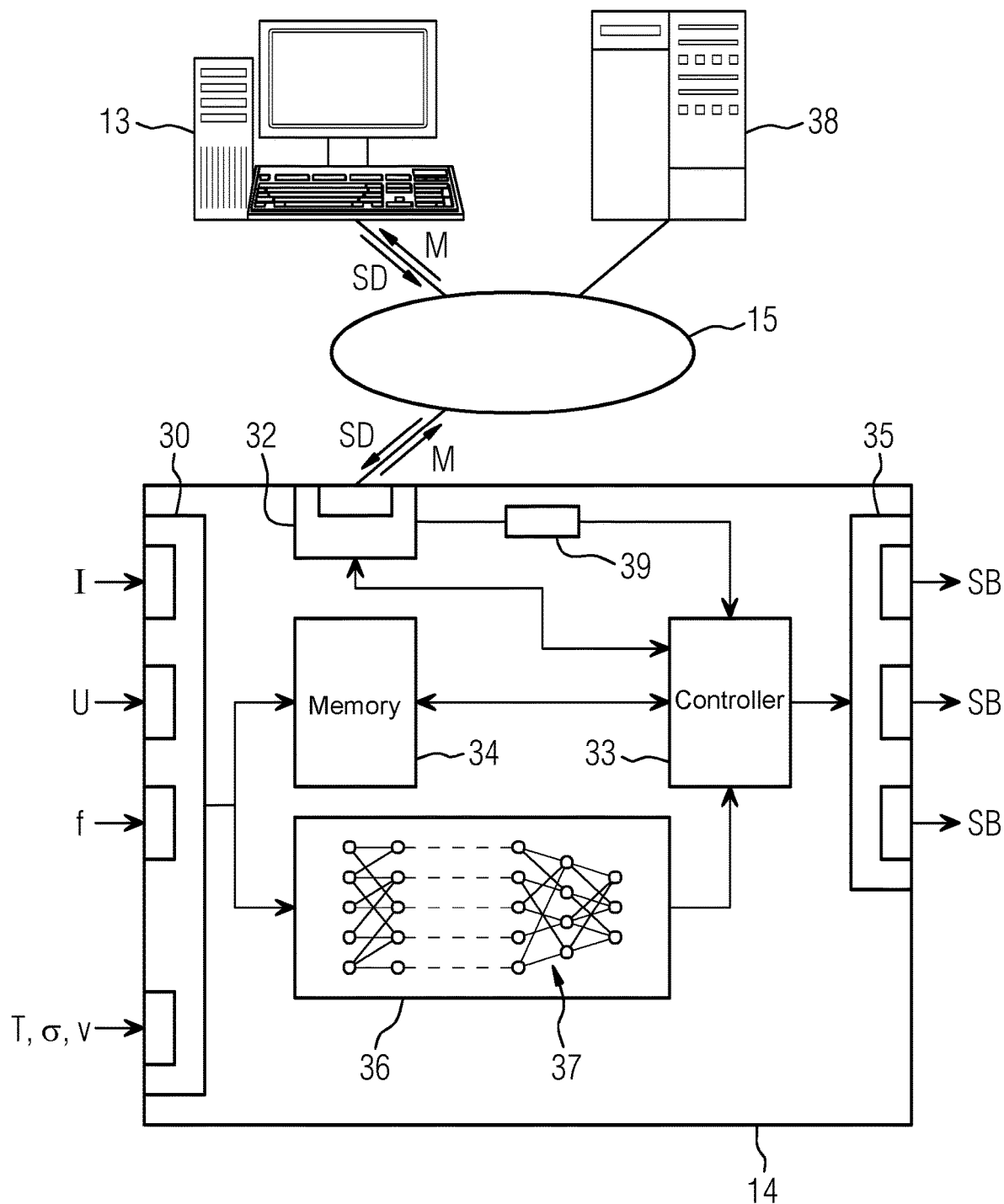
FIG. 3 is a schematic view of a local control device.

FIG. 3 shows a detailed view of a local control device 14. The local control device 14 contains a measured value recording device 30 with which measured values for current I, voltage U, frequency f and temperature T, solar radiation σ and wind strength v can be recorded. The local control device 14 furthermore has a communication device 32 which is connected via a communication connection 15 to the network control system 13 and via which, on the one hand, measured values M can be transmitted to the network control system 13 and, on the other hand, control data SD can be received from the network control system 13.

The local control device 14 furthermore has a control unit 33, e.g. a microprocessor or a processing module with hardware-programmed control (e.g. FPGA, ASIC) which is connected to a storage device 34. An output interface 35 for emitting control commands SB to actuators which can have a controlling effect on the devices of the distribution network is furthermore provided. Finally, the control device 14 also has an estimation device 36 with a self-learning system 37 in the form of an artificial neural network.

The local control device 14 operates as follows: During the ongoing operation of the distribution network, the control device 14 records measured values of at least one of the above-mentioned measured quantities via the measured value recording device 30. These may, for example, be electrical engineering measured quantities on the overvoltage and undervoltage side of a transformer in the connection station (cf. e.g. FIG. 2), for example current, voltage (in each case three-phase) and frequency. Alternatively or additionally, exogenous measured quantities such as temperature, solar radiation and wind speed can also be recorded either through direct local measurements or through an interface to a central IT service in order to receive either measured values or forecasts there. The measured values are stored in the storage device 34. They can be retrieved from there by means of the control unit 33 and can be transmitted via the communication device 32 to the network control system 13. This can be done cyclically or spontaneously. The measured values can be transmitted as raw data or after a preprocessing to the network control system. In this respect, the control device 14 performs the function of a merging unit, a remote terminal unit or a data concentrator.

During the operation of the energy supply network, the network control system defines control measures, i.e. requirements for system services which are intended to be provided via the distribution network, and transmits them in the form of control data to the local control device 14. They are received there with the communication device 32 and are forwarded to the control unit 33. Control commands which are forwarded to the output interface 35 are generated from the control data with the control unit 33. In this respect, the control device 14 performs the function of indirect control of the distribution network by evaluating requirements of the network control system and forwarding them to the corresponding devices of the distribution network.

The received control data SD are furthermore stored in the storage device 34 so that pairs of measured values and associated control data are present there. Any time delay can be taken into account, since the control data normally represent a response to a previously occurring state of the energy supply network and/or the distribution network, the generation of which takes a certain time. Time slices, for example, can also be formed here, so that a pair consists in each case of a plurality of measured values and control data associated with the common time period and stored in the data storage device. Training datasets are formed in this way for the estimation device 36.

The measured values are furthermore forwarded to the estimation device 36. In parallel with the reception of the control data SD from the network control system 13, the control device 14 defines control data estimated by means of the estimation device 36 from the present measured values. To do this, the estimation device 36 comprises a self-learning system 37, e.g. an artificial neural network, which is trained to establish a relationship between present measured values and the control data received from the network control system. To do this, it makes use of the training datasets stored in the storage device and uses them to train the self-learning system 37. Here, the estimation device 36 learns a relationship between the locally recorded measured values (electrical measured quantities and exogenous variables) and the control data indicating the system services required by the network control system. Alternatively, it can also be provided to allow this training to run in an external data processing device 38, for example in a data processing cloud. On completion of the training phase, the estimation method for defining the estimated control data runs in parallel with the normal operational processes described above. Estimated control data which indicate the expected requirements for system services are generated continuously by the estimation device 36 using the measured values. The control unit 33 continuously compares the control data received from the network control system 13 with the control data estimated by the estimation device. If substantial differences occur, a new training phase is instigated. In this way, the self-learning system 37 of the estimation device 36 is continuously trained to establish the required relationship between the system state indicated by the measured values and the system service requirements resulting therefrom.

During operation, a monitoring device 39 of the control device 14 continuously monitors the communication with the network control system 13. This can be done, for example, through the regular transmission of messages ("heartbeat signals") from the network control system 13 to the control device 14. As soon as these messages fail to appear, a communication fault is inferred. Alternatively, it can also be provided that the control device 14 regularly checks whether control data SD of the network control system 13 have been received in a user-parameterizable time period. If not, a communication fault is similarly inferred. As soon as a communication fault has been detected, the control device 14 switches to locally autonomous operation. During the locally autonomous operation, the estimated control data are used by the control unit 33 instead of the control data which are no longer receivable due to the communication fault in order to define the control commands SB. In this respect, the control device 14 performs a direct local control function for the distribution network until the communication with the network control system has been restored.

In addition, the control device 14 can also monitor the frequency on the overvoltage side of the transformer of the connection station in this locally autonomous operating mode in order to detect whether the network is currently in a state of restart following a blackout (complete network outage). If the frequency lies outside a certain range, the control commands are not defined on the basis of the estimated control data but using fixed, predefined control data which have been determined with a heuristic method. The reason for this is that black start situations very rarely occur and therefore no or not enough data are present to train the self-learning system. The heuristics therefore attempt to increase the generation and reduce loads (increase active power feed-in) if the frequency is understepped; if the frequency is exceeded, the generation is reduced and the loads are increased accordingly (reduce active power feed-in).

The control device described offers the following advantages: The control device 14 can organize the system services in the distribution network (local network), even if the communication with the network control system 13 is lost, in order to support the energy supply network (medium-voltage network) in its operational management. Locally autonomous continued operation is possible using the estimation device 36 in the event of a failure in the communication with the network control system 13. The estimation device 36 for the system service requirements requires no models whatsoever of the networks, neither of the energy supply network nor of the connected distribution network. The proposed control device 14 can therefore be put into operation in a very simple manner (plug-and-play) and can be operated efficiently with manageable processing power requirements. As already explained above, the current private communication networks of the network operators normally extend only as far as the substations upstream of the connection stations. The communication gap between the substations and the connection stations (e.g. local network stations) represents an obstacle to an active operational management of the distribution networks which will become increasingly necessary in future. The present control device 14 allows distribution networks to be actively managed even with an unreliable communication connection and thus bridges the gap in the future operational management concepts. It is thus possible to operate the distribution networks at the limits of their operating range without being concerned that the energy supply network will be overloaded or damaged by a lacking system service contribution of the distribution networks in the event of a failure of the communication between the network control system and the control device. The proposed solution can furthermore support the network operator in the reconstruction of the network following a blackout by using the flexibilities of the resources and end customer installations connected in the distribution network to reduce the power imbalances arising with the successive reconstruction of the network.

Although the invention has been illustrated and described in detail above by means of preferred example embodiments, the invention is not limited by the disclosed examples and other variations may be derived herefrom by the person skilled in the art without departing the protective scope of the patent claims set out below.

The invention claimed is:

1. A method for operating an electrical energy supply network connected to a connection station having a lower-level distribution network, an operation of the electrical energy supply network is controlled by means of a network controller, which method comprises the following steps of:
   recording measured values indicating an electrical state of the electrical energy supply network and/or the lower-level distribution network at the connection station with a local controller of the lower-level distribution network;
   determining a deviation of a current operational state of the electrical energy supply network from a required operational state and defining control measures which are suitable for restoring the required operational state with the network controller;
   transmitting control data from the network controller to the local controller, the control data indicating at least a part of the control measures which are intended to be carried out by devices of the lower-level distribution network;
   determining control commands for at least one device of the lower-level distribution network by means of the local controller using the control data received, wherein the control commands are suitable for controlling the devices in such a way that the lower-level distribution network carries out a required part of the control measures in relation to the electrical energy supply network;
   defining estimated control data by means of the local controller using the measured values, the estimated control data being defined by a self-learning system;
   monitoring a communication connection between the local controller and the network controller; and
   determining the control commands using the estimated control data instead of the control data received in an event of a fault in the communication connection.

2. The method according to claim 1, which further comprises selecting the measured values from the group of measured quantities consisting of an AC electric current, AC electric voltage, a frequency of the AC electric current, a temperature, solar radiation and wind strength.

3. The method according to claim 1, which further comprises using training data which contains pairs of the measured values and associated parts of the control data received to train a behavior of the self-learning system.

4. The method according to claim 3, which further comprises carrying out a training of the self-learning system by the local controller.

5. The method according to claim 3, which further comprises:
   transmitting the training data to an external data processing device for training the self-learning system; and
   generating system parameters with the external data processing device in a learning process, the system parameters being transmitted to the self-learning system following a learning process and being adopted by the self-learning system.

6. The method according to claim 3, which further comprises comparing the control data received with the estimated control data by means of the local controller and in an event of an unacceptable difference, a behavior of the self-learning system is retrained.

7. The method according to claim 1, which further comprises transmitting the measured values from the local controller to the network control system of the electrical energy supply network.

8. The method according to claim 1,
   which further comprises recording a frequency of a current on an energy supply network side of the connection station by means of the local controller; and
   wherein in the event of the fault in the communication connection, fixed, predefined control data are used instead of the estimated control data if the frequency lies outside a predefined frequency band.

9. The method according to claim 8, wherein:
   in a case of the frequency lying above the predefined frequency band, the predefined control data effect control commands which cause an increase in an active power consumption by the lower-level distribution network; and
   in a case of the frequency lying below the predefined frequency band, the predefined control data effect the control commands which cause a reduction in the active power consumption by the lower-level distribution network.

10. A local controller for controlling devices of an electrical distribution network, the local controller comprising:
   a measured value recording device to record measured values;
   a communication device to receive control data from a network controller of an energy supply network at a higher level than the electrical distribution network, wherein the control data indicate at least a part of control measures which are intended to be carried out by devices of the electrical distribution network;
   a controller for determining control commands for at least one of the devices of the electrical distribution network using the control data received, wherein the control commands are suitable for controlling the devices in such a way that the electrical distribution network carries out the control measures;
   an estimation device for defining estimated control data using the measured values, said estimation device having a self-learning system for deriving the estimated control data;
   a monitor for monitoring a communication connection between said communication device and the network control system; and
   said controller configured to determine the control commands using the estimated control data instead of the control data received if there is a fault in the communication connection.

* * * * *